A. M. STANLEY.
WHEEL.
APPLICATION FILED AUG. 7, 1914.
1,168,228.
Patented Jan. 11, 1916.
3 SHEETS—SHEET 1.
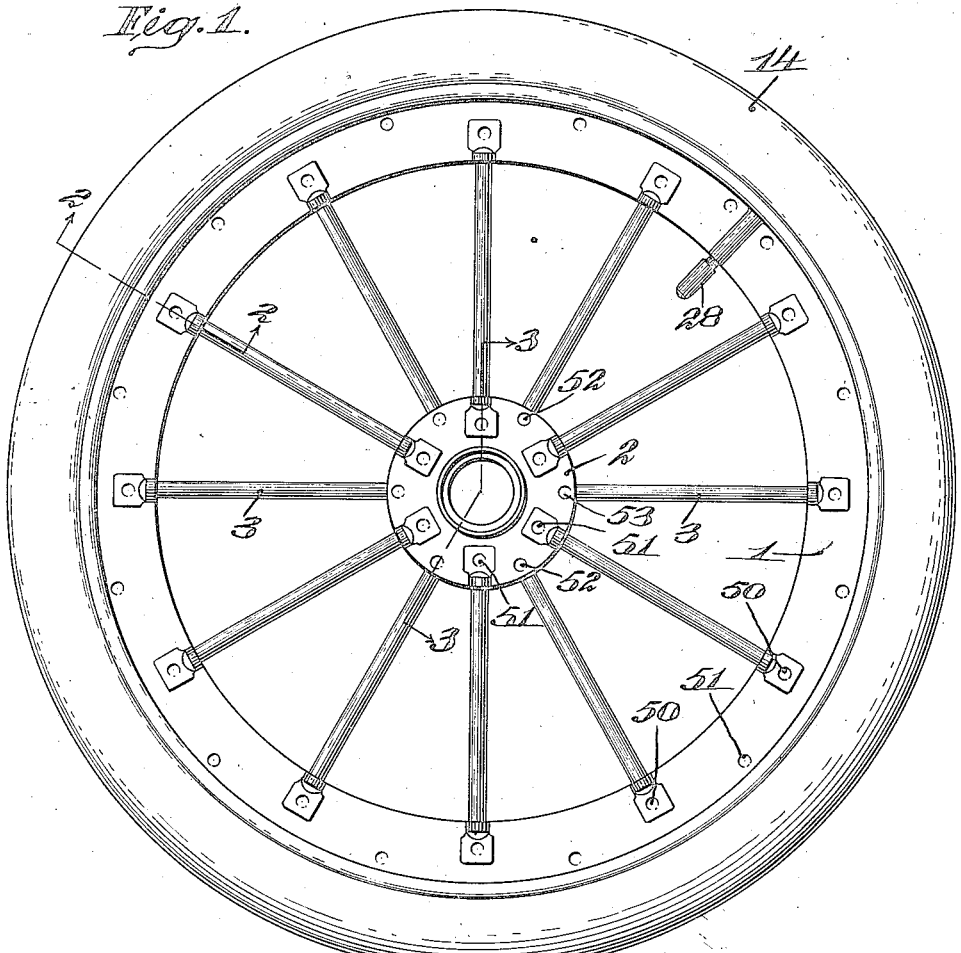
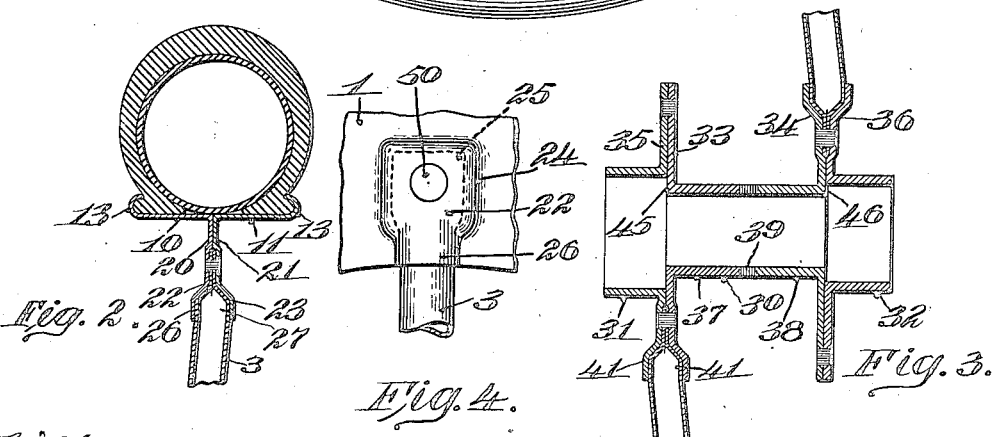

A. M. STANLEY.
WHEEL.
APPLICATION FILED AUG. 7, 1914.
1,168,228.
Patented Jan. 11, 1916.
3 SHEETS—SHEET 2.
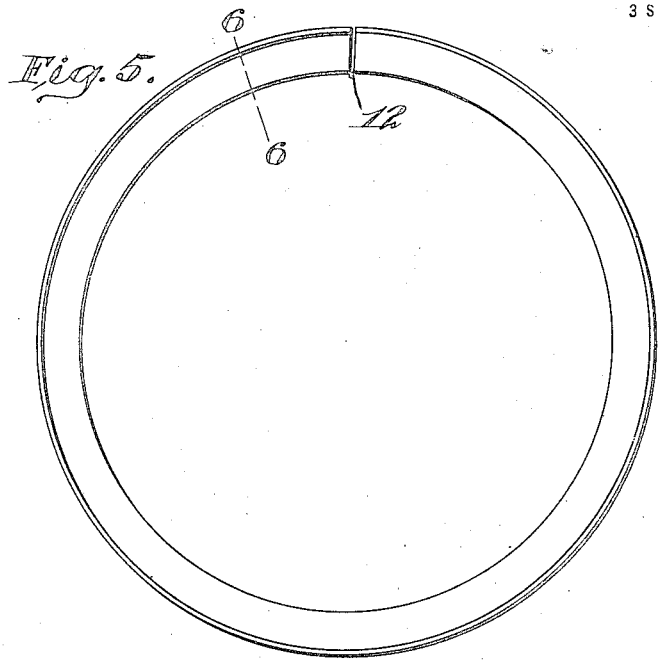
Fig. 5.
Fig. 6.
Fig. 7.
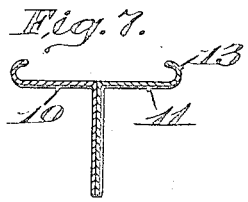
Fig. 8.
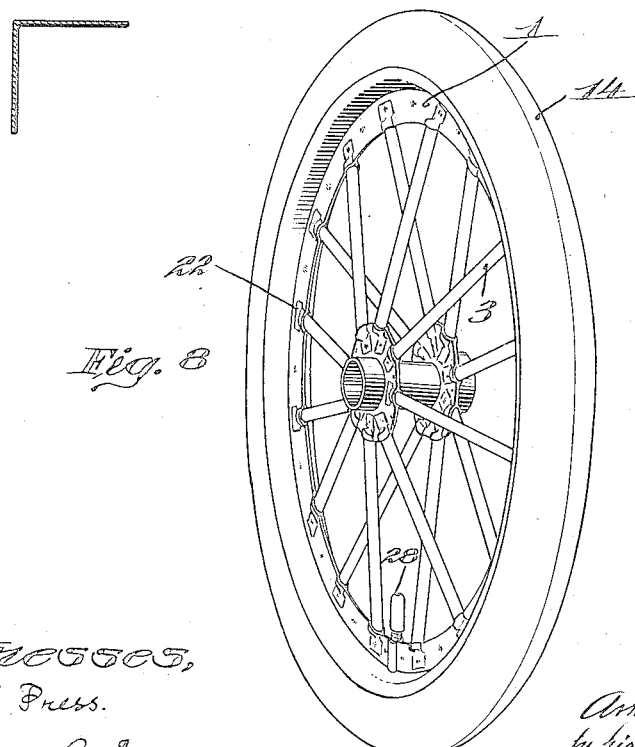
Witnesses,
Elsie Press.
Miriam C. Query
Inventor,
Arthur M. Stanley
by his attorneys
Phillips, Van Everen & Fish

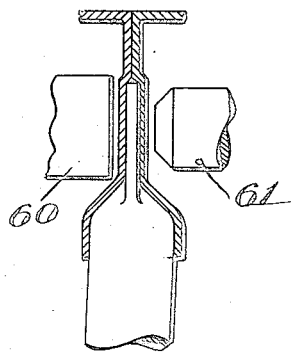
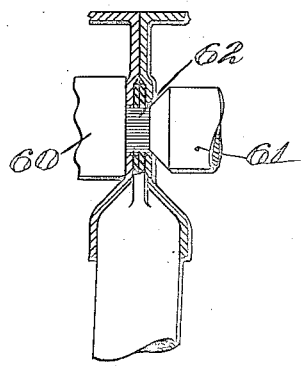
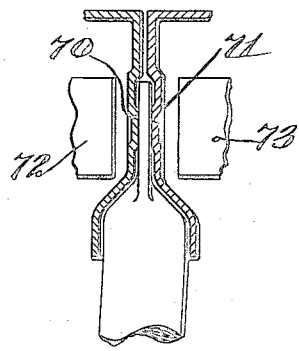
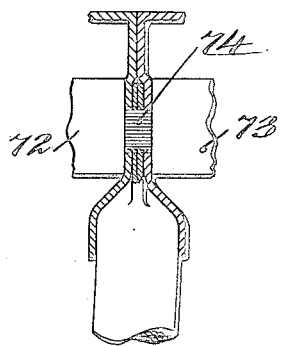
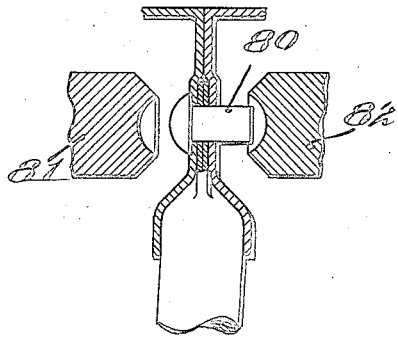
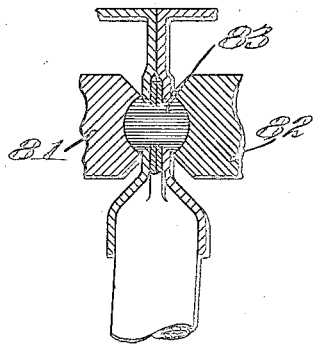

UNITED STATES PATENT OFFICE.

ARTHUR M. STANLEY, OF LYNN, MASSACHUSETTS, ASSIGNOR TO WARREN K. BLODGETT, OF CAMBRIDGE, MASSACHUSETTS.

WHEEL.

1,168,228.  Specification of Letters Patent.  Patented Jan. 11, 1916.

Application filed August 7, 1914. Serial No. 855,622.

*To all whom it may concern:*

Be it known that I, ARTHUR M. STANLEY, a citizen of the United States, residing at Lynn, in the county of Essex and State of Massachusetts, have invented certain new and useful Improvements in Wheels; and I do hereby declare the following to be a full, clear, and exact description of the invention, such as will enable others skilled in the art to which it appertains to make and use the same.

The present invention relates to wheels, and more particularly to vehicle wheels built up of a number of metallic parts joined into an integral structure.

The object of the invention is to produce a wheel which is cheap to manufacture and which at the same time is of great strength and rigidity and of comparatively light weight.

With the above object in view, the present invention consists in the wheel hereinafter described and particularly pointed out in the claims.

In the drawings, Figure 1 is an elevation of an automobile wheel constituting the preferred embodiment of the invention; Fig. 2 is a section on the line 2—2 of Fig. 1; Fig. 3 is a section on the line 3—3 of Fig. 1; Fig. 4 is a detail view showing the flattened end of a spoke lying in one of the recesses which forms one side of a spoke receiving pocket; Fig. 5 is an elevation of one of the angle steel bars forming half of the wheel rim after it is bent into circular shape and before it is butt welded; Fig. 6 is a section on the line 6—6 of Fig. 5; Fig. 7 is a cross section of the wheel rim taken at a place between the spoke pockets; Fig. 8 is a perspective view of the wheel; Figs. 9 and 10 are detail views showing the process of spot welding the spokes; Figs. 11 and 12 are detail views showing the process of projection welding the spokes; and Figs. 13 and 14 are detail views showing the process of rivet welding the spokes.

In the drawings, the invention is illustrated as embodied in an automobile wheel. The wheel consists of a rim portion 1, a hub portion 2, and spokes 3.

The rim portion 2 is built up of two pieces or halves 10 and 11 which consists of steel rings of L-shaped cross section. In forming one of the rings 11 and 12 a bar of steel which has been rolled into the shape of ordinary angle iron, as shown in cross section in Fig. 6, is bent into the circular shape shown in Fig. 5. The ends of the ring are butt welded at the joint 12 to form a continuous ring. On the edge of each rim piece 10 and 11 is a lip 13 which is formed by means of a drawing die and serves to receive the bead of the automobile tire 14. While in the illustrated embodiment of the invention the ring is formed so as to receive a clencher tire, it is obvious that the form of the rim may be varied so as to adapt it to receive a quick detachable tire or a demountable rim. While it is preferred to make the rim pieces out of angle steel as above described, nevertheless the rim pieces 10 and 11 may be made by stamping rings from flat sheet steel and then pressing them in a drawing die to give them the desired L-shaped cross section. By means of a die there are pressed in the inwardly extending flanges 20 and 21 of the rim pieces 10 and 11 respectively a number of depressions 22 which match when the flanges are in contact to form pockets 23 for the reception of the ends of the spokes 3. The spokes 3 are formed of steel tubing and both ends of the spokes are pressed flat into the shape shown in Fig. 4 and in Figs. 9–14. The pockets 23 are formed with comparatively narrow or flat end portions 24 for the reception of the flattened ends 25 of the spokes and with rounded or cylindrical mouth portions 26 for the reception of a short length of the cylindrical or tubular shank portions 27 of the spokes. The shoulders 29 which are thereby formed on the sides of the pockets at the junction of the flat and cylindrical portions thereof serve to positively lock the flattened ends of the spokes in the pockets when the flanges are in contact. The weakest portion of the spoke is at the point where the tubular portion 27 emerges with the flattened portion 25. At this point the metal which forms the walls of a pocket 23 surrounds and reinforces the spoke and also serves to conceal the end of the spoke so that the spoke where it emerges from the rim is tubular. This not only contributes to the strength of the wheel, but also conduces to its attractive appearance. Opposing semi-cylindrical recesses are also pressed in the flanges 15 to form the hole for the valve stem 28.

The hub 2 is built up of a central piece or barrel 30 and two end pieces 31 and 32. The central piece has two outwardly and radially extending end flanges 33 and 34, and the two end pieces 31 and 32 have similar flanges 35 and 36 which fit against the flanges 33 and 34 respectively. In making the end pieces 31 and 32, circular disks are stamped out of sheet metal and these stampings are then pressed by means of dies into the proper shape so that they form the rings of L-shaped cross section which constitute the end pieces 31 and 32. The central piece 30 is built up of two parts 37 and 38. The two parts 37 and 38 are each rings of substantially L-shaped cross section which are stamped and pressed from sheet steel in the same manner as the end pieces. The inner or tubular ends of the parts 37 and 38 are butt welded, as indicated at 39, so as to form the integral central piece or barrel 30 which is substantially U-shaped. When the pieces 30, 31 and 32 are formed, the recesses 40 are pressed in their flanges by means of a die. The recesses in the respective flanges match with each other to form pockets 41 for the reception of the inner ends of the spokes. The inner ends of the spokes are flattened like the outer ends and the pockets 41 have substantially the same shape as the rim pockets 23, the pockets by virtue of their shape serving to form positive locks for the flattened ends of the spokes, and the cylindrical mouth portions of the pockets serving to surround and support the inner ends of the tubular shanks of the spokes. The pockets 41 at opposite ends of the hub are annularly offset or staggered so that alternate spokes are secured at opposite ends of the hub as shown, for example, in Fig. 8. The inner ends of the alternate spokes are therefore separated axially of the hub and this gives great lateral strength and rigidity to the wheel.

The tubular portion of the central barrel 30 is of smaller diameter than the tubular portions of the end pieces 31 and 32 so that at the ends of the central barrel 30 are formed shoulders or ledges 45 and 46. These shoulders or ledges 45 and 46 may be utilized for holding bearings which are placed within the end pieces 31 and 32, and thus dispensing with any separate operation for forming such bearing shoulders.

The wheel illustrated in Figs. 1 and 8 is assembled and welded as follows: The rim pieces 10 and 11 are placed together with the ends of the spokes in the pockets 23, and the three pieces 30, 31 and 32 of the hub are placed together with the inner ends of the spokes in the pockets 41. When the parts are thus assembled they are welded together. The spokes are united with the rim flanges and with the hub flanges by welded regions which extend through the flattened ends of the spokes and include the metal of the flanges which forms the pocket walls. These welded regions therefore not only secure the ends of the spokes in the pockets, but also serve to form an integral connection between the flanges at their pocket portions. The welds at the spoke ends are indicated at 50 in Fig. 1. In addition to the union formed between the flanges at the spoke pockets, the flanges are welded together at places between the spokes. The welds which are located between the spokes in the rim flanges are indicated at 51 and are nearer the outer peripheral edges of the flanges than the spoke welds. The welds 51 therefore firmly unite the two rim pieces close to the periphery of the wheel so as to cause the rim to better sustain the strains to which its peripheral portion is subjected. The welds which are located between the spokes on the hub flanges are indicated at 52 and serve to impart additional strength to the hub by integrally uniting the hub flanges between the spokes. The welds are preferably formed by electric spot welding.

The process of spot welding at the end of the spoke in its receiving pocket is indicated in Figs. 9 and 10. The two welding electrodes 60 and 61 are placed on opposite sides of the flanges at one of the pockets and the welding current is applied. The reduced end of the electrode 60 serves to localize the current and soften the metal in a limited region or spot. After the metal is softened, the electrodes are pressed together to form the spot weld which is familiar to those skilled in the art. The welded region which is indicated at 62 in Fig. 10 extends through both pocket walls and the flattened end of the spoke integrally uniting the spoke and both flanges. The spot welds which are located in the rim and hub flanges between the spokes are similarly formed, the welded regions serving to form an integral connection between the flanges at these points.

In Figs. 11 and 12 is illustrated the method of electric projection welding which may be employed in welding the parts of the wheel together. When the matching recesses which form the spoke receiving pockets are pressed in the flanges, two oppositely disposed projections 70 and 71 are pressed in the metal so that when the spoke is placed in the pocket the projections 70 and 71 lie against the flattened end of the spoke. Welding electrodes 72 and 73 are placed against opposite sides of the pockets and the welding current is applied. The projections 70 and 71 serve to localize the welding current so that the metal forming the projections 70 and 71 together with the metal of the spoke which lies between them is softened. Then the electrodes are pressed together forming the weld illustrated in Fig. 12. The welded region 74 includes the metal of the pocket walls and the metal of the flattened end of the spoke forming an integral and autogenous union between them. The welds in the flanges between the spokes may be similarly formed by projection welding.

In Figs. 13 and 14 is illustrated the method of rivet welding, which may be also employed in welding the parts of a wheel together. As shown in Fig. 13, a hole is bored through the metal where the weld is to be formed and a rivet 80 placed therein. Two welding electrodes 81 and 82 are placed on opposite sides of the work in electric contact with the ends of the rivet, and the welding current is applied. The current is localized in the rivet and the parts of the metal immediately surrounding the rivet which are softened by the heat. When the metal is sufficiently softened, the two electrodes 80 and 81 are pressed together, forming the weld shown in Fig. 14. The metal which formed the rivet is welded with the metal of the flanges and the spokes, as indicated at 83 in Fig. 14, so as to form an integral connection between all of these parts. The welds in the flanges between the spokes may be formed in similar process of rivet welding.

All of the parts of the wheel are formed of bar, sheet or tube steel pressed into the shapes desired. It will be seen therefore that the parts of the wheel are such as are easily and cheaply made. Moreover, the parts of the wheel are light so that while the wheel possesses great strength it is nevertheless much lighter than the wheels now in use. The welds are autogenous in character and serve to integrally unite the several parts of the wheel so that the entire wheel structure forms an integral and homogeneous whole and there are no loose parts such as bolts to break or become loose. The wheel, aside from being strong and cheap to manufacture, resembles the artillery wheel and has an attractive appearance.

While the preferred embodiment of the present invention has been illustrated and described, it is to be understood that the invention is not limited to its preferred embodiment, but may be embodied in other types and constructions of wheels within the scope of the invention as set forth in the following claims.

I claim—

1. A metal wheel comprising a rim including two parts having flanges in contact with each other and having oppositely disposed recesses pressed in the flanges to form pockets between them, said pockets having narrow flat end portions and round mouth portions, and tubular spokes having flattened ends received in the flat end portions of the pockets and having short lengths of their tubular shanks received and supported in the round mouths of the pockets, said spokes being welded in the pockets by welded regions extending through the flattened ends of the spokes and including the metal of the pocket walls.

2. A metal wheel comprising a rim including two rings of substantially L-shape cross section having inwardly extending flanges in contact with each other, the flanges being provided with recesses pressed therein to form pockets, and tubular spokes having flattened ends received in the pockets and secured therein by welded areas extending through the flattened ends of the spokes and the flanges.

3. A metal wheel comprising a rim including two rings of substantially L-shape cross section, each ring made of a bar of angle metal bent into circular shape and butt-welded, the rings having inwardly extending flanges in contact with each other and provided with recesses pressed therein to form pockets between the flanges, and spokes having flattened ends received and welded in the pockets.

ARTHUR M. STANLEY.

Witnesses:
BURTON W. CARY,
MIRIAM C. QUERY.